United States Patent [19]

Hill

[11] Patent Number: 5,622,036
[45] Date of Patent: Apr. 22, 1997

[54] OSCILLATING BLOWER FOR REMOVING TREE FRUIT AND NUTS

[75] Inventor: Daryl G. Hill, Yakima, Wash.

[73] Assignee: Orchard-Rite Ltd., Inc., Yakima, Wash.

[21] Appl. No.: 468,759

[22] Filed: Jun. 6, 1995

[51] Int. Cl.$^6$ ..................................................... A01D 46/00
[52] U.S. Cl. ......................... 56/12.8; 56/328.1; 56/340.1
[58] Field of Search ........................... 56/12.8, 12.9, 56/16.4 R, 328.1, 340.1, DIG. 8

[56] References Cited

U.S. PATENT DOCUMENTS

| | | | |
|---|---|---|---|
| 3,310,231 | 3/1967 | Wininger | 56/328.1 X |
| 3,455,502 | 7/1969 | Pool et al. | 56/328.1 X |
| 3,720,050 | 3/1973 | Rozinska | 56/DIG. 8 X |
| 4,175,368 | 11/1979 | Scheffler | 56/328.1 |
| 5,499,490 | 3/1996 | Minnich | 56/328.1 X |

*Primary Examiner*—Terry Lee Melius
*Assistant Examiner*—Heather Shackelford

*Attorney, Agent, or Firm*—Jacobson, Price, Holman & Stern, PLLC

[57] ABSTRACT

An oscillating blower that includes an air discharge for cyclically impinging high velocity air onto and into the canopy of a fruit or nut tree thereby providing a novel method for shaking the limbs of a tree and create the same shaking action as a tree shaker by oscillating the blower at a selected proper frequency. The oscillating blower not only shakes the limbs to remove the nuts or fruit but also dislodges the nuts or fruits by blowing them off the supporting stems. The oscillating blower also removes residual fruit or nuts that were not harvested during the normal harvesting operation such as when a conventional tree shaker is used for dislodging the fruit or nuts from the tree. The residual fruit or nuts left on the tree by a tree shaker frequently become infested with worms or other pests that may infest the fruit or nut tree and adversely affect the crop produced during the next growing season. In the fruit and nut growing and harvesting industry, the fruit and nuts left on a tree after harvesting by shaking the tree are generally referred to as "mummies" and, as indicated above, it is important to remove the "mummies" during the winter season.

16 Claims, 2 Drawing Sheets

5,622,036

OSCILLATING BLOWER FOR REMOVING TREE FRUIT AND NUTS

BACKGROUND OF THE INVENTION

1. Field of the Invention

The present invention is an oscillating blower that includes an air discharge for cyclically impinging high velocity air onto and into the canopy of a fruit or nut tree thereby providing a novel method for shaking the limbs of a tree and create the same shaking action as a tree shaker by oscillating the blower at a selected proper frequency. The oscillating blower not only shakes the limbs to remove the nuts or fruit but also dislodges the nuts or fruits by blowing them off the supporting stems. The oscillating blower also removes residual fruit or nuts that were not harvested during the normal harvesting operation such as when a conventional tree shaker is used for dislodging the fruit or nuts from the tree. The residual fruit or nuts left on the tree by a tree shaker frequently become infested with worms or other pests that may infest the fruit or nut tree and adversely affect the crop produced during the next growing season. In the fruit and nut growing and harvesting industry, the fruit and nuts left on a tree after harvesting by shaking the tree are generally referred to as "mummys" and, as indicated above, it is important to remove the "mummys" during the winter season.

2. Background of the Invention

When harvesting nuts and fruits, tree shakers are used to separate the nuts and fruits from the tree by gripping the tree trunk and mechanically shaking the entire tree at a proper frequency and amplitude. Certain types of nut or fruit trees, especially young trees, are prone to suffer trunk and root damage when harvested with a conventional tree shaker. The tree shaking harvesting operation does not remove all nuts and fruit thus leaving a small amount of residual nuts or fruits, commonly referred to as "mummys" on the trees. If the "mummys" are not removed, they become infested with worms or other pests and adversely affect the next years crop. Currently, the method of removal of the residual nuts and fruits is to await a period of damp and foggy weather which normally occurs during the winter months and the growers then use their tree shakers to remove the "mummys" from the tree. It is necessary to wait until winter and foggy weather inasmuch as the "mummys" will only loosen when they are damp with moisture in order for the tree shaking operation to be effective.

A long existing problem of the current procedure for harvesting or removing "mummys" is that the tree shakers cannot get into the orchard and move along a row of trees when the soil is wet inasmuch as the tree shakers are relatively heavy and tend to tear up the ground when it is damp or wet and in some instances can become mired or stuck in mud thus requiring the use of a tractor or other towing vehicle to tow the tree shaker thus causing further damage to the orchard area.

SUMMARY OF THE INVENTION

An object of the present invention is to provide a solution to existing problems resulting from the current method of using a tree shaker for harvesting nuts or fruit and removing "mummys" from the tree by using an oscillating blower to cyclically impinge high velocity air onto the canopy of a tree to shake the tree limbs to dislodge nuts or fruit by shaking and to blow the nuts and fruit from the tree limbs and to subsequently remove any "mummys" remaining on the tree limbs to effectively harvest nuts or fruit and remove residual nuts or fruits without utilizing a tree shaker.

Another object of the invention is to provide an oscillating blower mounted on a lightweight wheeled trailer which can be towed through the orchard with a small tractor thereby enabling the grower to effectively harvest nuts or fruit and subsequently remove "mummys" under various conditions including wet conditions that would preclude the use of a tree shaker.

A further object of the invention is to provide an oscillating blower in accordance with the preceding objects which has the advantage of not damaging next years bud set if the bud set is at an advanced stage thus providing the grower a greater amount of time to remove the "mummys" before full bloom as compared to a tree shaker which may damage the bud set if the bud set is too far advanced thereby reducing the crop yield.

Still another object of the invention is to provide an oscillating centrifugal blower having a housing with a tangential discharge with the blower being powered by an internal combustion engine or any other suitable drive arrangement with the tangential discharge being directed toward sequentially arranged trees in a row when the blower and trailer is moved along the row of trees.

Yet another object of the invention is to provide an oscillating blower in accordance with the preceding object in which the housing is oscillated to move the tangential discharge vertically in an arcuate plane in a cyclic manner in order that the high velocity blast of air discharged from the blower will sweep up and down the tree for cyclically impinging a high velocity air stream on the nut or fruit and tree limbs for harvesting and later removing the "mummys" by creating a shaking motion of the tree limbs for dislodging the nuts and fruit.

Another significate object of the invention is to provide an oscillating blower for cyclically impinging high velocity air against the canopy of a nut or fruit tree by oscillating the blower housing so that the discharge moves arcuately in a vertical plane by sweeping through an arc of approximately 60° to 90° every two or three seconds for efficient impinging of the air blast against the tree canopy and assures that optimal shaking frequency, air velocity and volume are obtained.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
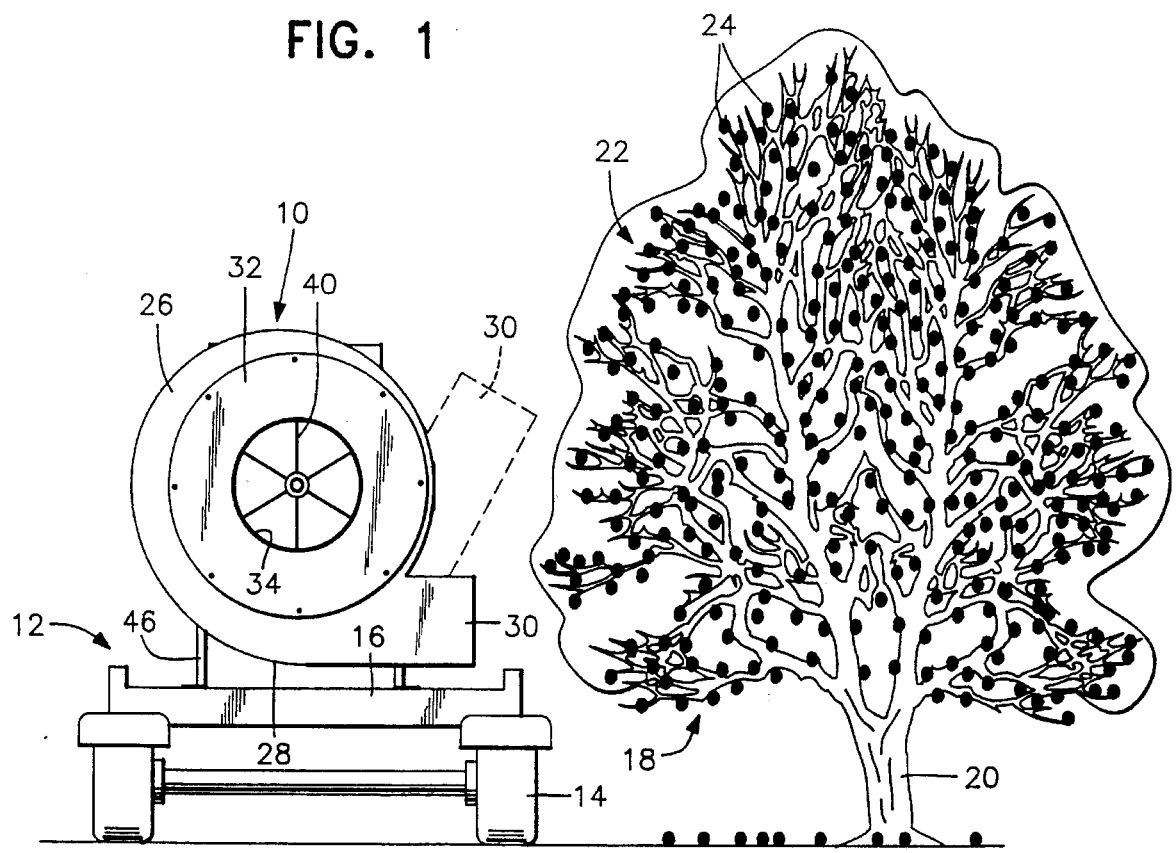
FIG. 1 is an end elevational view of a trailer unit with an oscillating blower mounted thereon illustrating the oscillating movement of the tangential discharge of the blower in a vertical plane for directing a high velocity air blast toward the canopy of a tree to sweep the tree with a high velocity air blast in a cyclic manner to create a shaking motion for removing nuts or fruits from the tree.

Referring now to the drawings, the oscillating blower of the present invention is generally designated by reference numeral 10 and, as illustrated in FIG. 1, the blower 10 is mounted on a trailer unit 12 having ground engaging supporting wheels 14 and a supporting frame 16 on which the blower is mounted for movement along a row of nut or fruit trees generally designated by reference numeral 18 which include a tree trunk 20 and a canopy 22 with nuts or fruit 24 supported therefrom. The nuts or fruit may be a harvested crop or residual nuts or fruits which are generally referred to as "mummys" and are left on the tree 18 as a result of harvesting nuts or fruits by use of a tree shaker which engages and shakes the tree trunk 20. Removal of the "mummys" is necessary during the winter season or non-growing season to avoid the possibility of the "mummys" becoming infested with worms or other pests which will adversely affect next years crop yield of the tree.

The blower 10 includes a generally cylindrical housing 26 which has a spiral external configuration 28 defining a tangential air discharge 30 which is oriented in perpendicular relation to the path of travel of the trailer unit 12 for directing a high velocity blast of air toward the tree 18. One end of the housing 26 includes a removable plate 32 provided with an air inlet 34 at the center thereof. The air inlet 34 is defined by a cylindrical flange 35 and may be provided with a screen as a safety measure and to prevent entry of debris into the blower. Positioned within the housing 26 is an impeller 36 which includes a central hub 38 and radial vanes or blades 40 associated with the housing 26, the inlet 34 and the discharge 30 in a manner to discharge a high velocity air stream or air blast from the discharge 30. The plate 32 provides access to the impeller 36 for replacement or repair.

The hub 38 of the fan or blower impeller 36 is mounted on and driven by an output shaft 42 from a power unit 44 in the form of an internal combustion engine. The engine or prime mover 44 is supported from the frame 16 by support members 46 having adequate strength for providing a rigid support for the prime mover 44. Conventional mounting techniques may be provided for the prime mover 44 to reduce vibration transmitted to the trailer unit 16 and the supporting members may be rigidly affixed to the frame 16 in any suitable manner. By varying the size of the blower and the power output capacity of the prime mover, motor or engine 44, a blast of air at a relatively high velocity can be discharged from the blower discharge 30 toward the tree 18.

Figure 2:
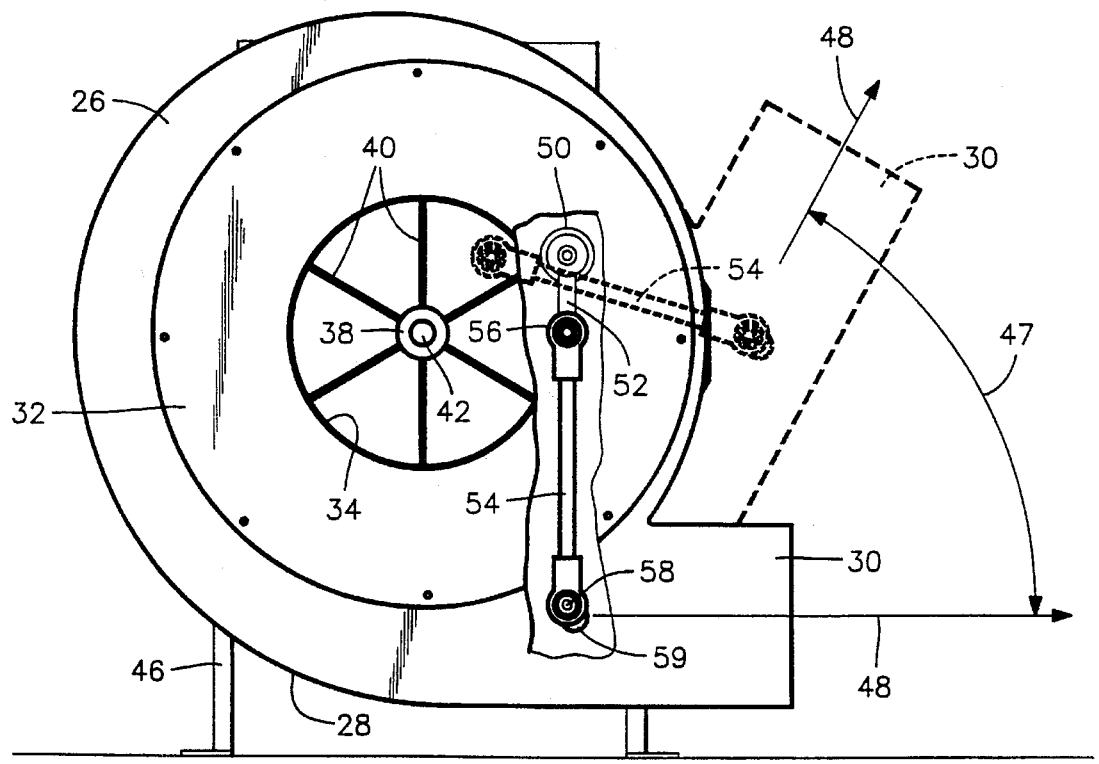
FIG. 2 is an elevational view of the blower with portions broken away illustrating the structure for oscillating the blower housing.
Figure 3:
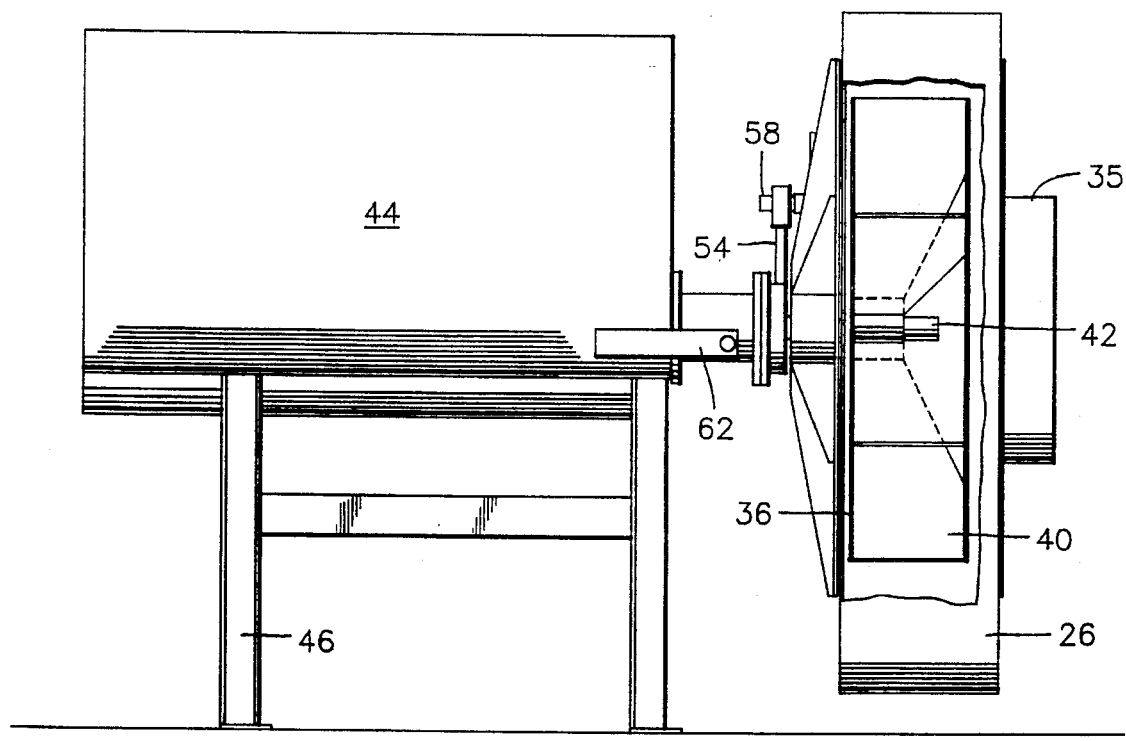
FIG. 3 is a side elevational view of the blower illustrating the relationship of the drive motor to the blower impeller and housing.
Figure 4:
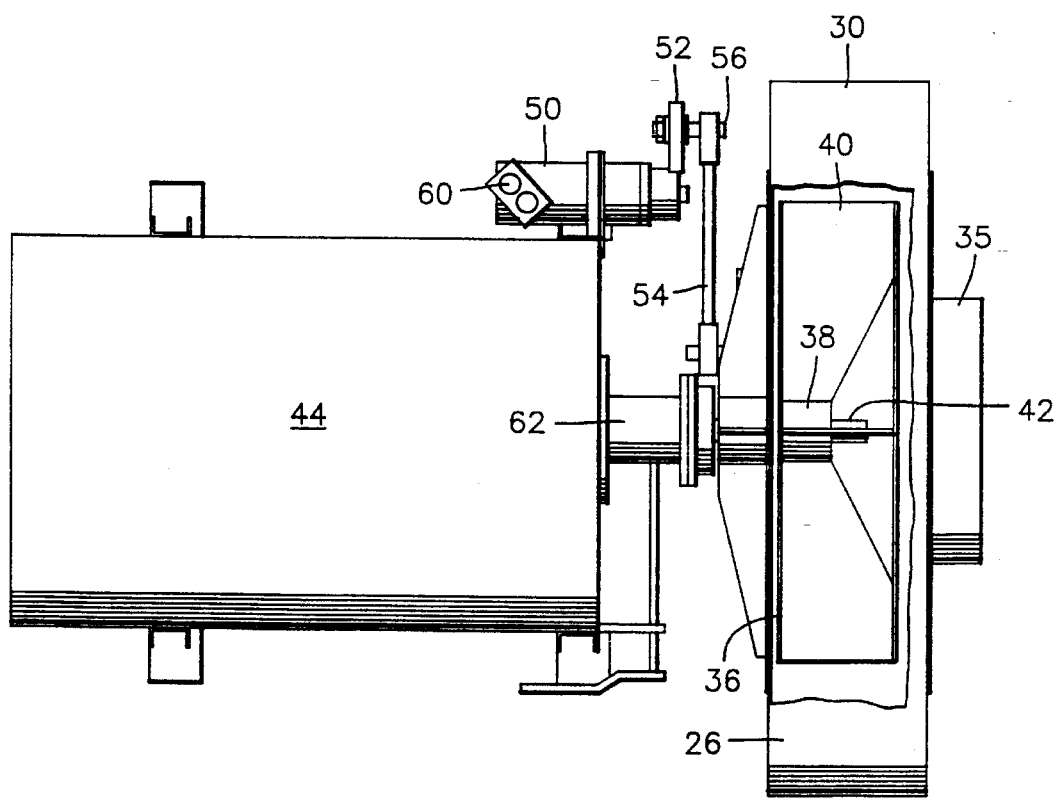
FIG. 4 is a top plan view of the blower illustrating the structure for oscillating the blower housing.

The blower housing 26 along with the tangential discharge 30 is oscillated in a vertical plane between the full line position illustrated in FIG. 2 and the broken line position through an arc 47 ranging between 60° and 90°. Also, FIG. 2 illustrates the discharge direction of the high velocity air blast by arrow 48. The structure for oscillating the blower housing 26 about the axis of shaft 42 includes a motor 50 having a laterally extending arm 52 attached to its output shaft for movement of the outer end of the offset arm or crank 52 in a circular path about the center of the output shaft of the motor 50. Attached to the crank 52 in spaced relation to the rotational axis of the output shaft of the motor 50 is a connecting rod or pitman rod 54 pivotally connected to the crank 52 by a pivotal connection in the form of a bolt 56 or the like. The other end of the connecting rod or pitman rod 54 is connected to the housing 26 at the outer periphery thereof by a pivot bolt 58 and bracket assembly 59. The motor 50 is in the form of a hydraulic motor having fittings 60 for connection with a hydraulic pump and control valve (not shown) to drive the motor 50 to provide cyclic oscillation of the housing and cyclic impingement of high velocity air onto the canopy of a tree in a sweeping motion over an angle of generally 60° but as much as 90° with the frequency of oscillation ranging between 2 and 3 seconds to introduce a shaking motion by sweeping the high velocity blast of air up and down the tree canopy with the induced shaking motion of the nuts or fruit and the "mummys" in the tree canopy for dislodging the nuts and fruit and "mummys" from the tree.

The frequency of oscillation and thus each cycle of the sweep of high velocity air can be adjusted depending upon the physical conditions encountered, such as the vertical height of the tree canopy and the number of sweeps required to fully remove the nuts or fruit or "mummys". The power unit or motor 44 may be a gasoline or a diesel engine and a supporting structure 62 between the engine assembly and the fan or blower 10 supports the drive shaft 42 and the housing 26 to enable oscillation of the housing. The crank arm 52 attached to and driven by the hydraulic motor output shaft moves the armor connecting rod 54 that oscillates the fan housing. The crank arm 52 length and the drive arm or rod 54 length can be adjustable and the motor speed is adjustable to control the velocity of the air. The fan housing could also be oscillated and controlled by a hydraulic piston and cylinder assembly connected between a frame and the housing of the blower 10 to oscillate the housing 26 in a similar manner. When the blower is oscillated at a proper frequency with an adjusted velocity air stream, nuts or fruit or "mummys" will be shaken off and/or blown off the tree limbs with the shaking action being substantially the same as that created by a conventional tree shaker.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A blower for dislodging nuts or fruit from a tree, said blower including a housing having a discharge directed toward a tree canopy, and means oscillating said blower to cause cyclic impingement of a high velocity air blast on the tree canopy for imparting oscillating movement to the tree limbs and nuts or fruit thereon thereby separating nuts and fruit from the tree, said means oscillating the blower moving the blower about an axis to move the discharge in an arcuate sweeping motion in relation to the tree canopy, said housing is generally cylindrical and provided with a substantially straight, rigid tangential discharge, rotatable impeller in the housing having radial vanes, said housing including a central, axial inlet for admitting air into the housing for engagement by said impeller and discharge of air through the tangential discharge, said means oscillating the blower including an actuating member connected to the blower housing in spaced relation to the rotational axis of the blower impeller for oscillating the housing and tangential discharge about the axis of rotation of the impeller for cyclically sweeping the high velocity air blast vertically up and down the tree canopy.

2. The blower as defined in claim 1 wherein said housing is mounted on a mobile unit capable of being moved longitudinally along a row of nut or fruit trees for sequentially impinging a high velocity air blast onto a series of trees.

3. The blower as defined in claim 2 wherein the mobile unit is in the form of a wheeled vehicle, said housing being mounted on said wheeled vehicle with the discharge being perpendicular to the path of movement of the vehicle for discharge of a high velocity air blast toward the trees and a power unit mounted on the vehicle for driving the blower.

4. The blower as defined in claim 3 wherein said wheeled vehicle is a lightweight unit enabling the blower to be moved through an orchard to enable removal of nuts or fruit from the trees during damp, wet and foggy conditions without damage to the orchard.

5. The blower as defined in claim 1 wherein said actuating member is a rod pivotally connected to said housing and power means connected to said rod to move the rod in a manner to oscillate the housing.

6. The blower as defined in claim 5 wherein said power means includes a drive motor having a rotatable output shaft, a radially extending crank arm mounted on said shaft, and means pivotally connecting said rod to said crank arm.

7. A blower for cyclically directing an air flow toward a target area, said blower including a generally cylindrical housing having a tangential air discharge and an axial air inlet, a rotatable driven impeller mounted in said housing for rotation about an axis generally in alignment with a central area of said air inlet, said impeller including a plurality of vanes extending radially from said axis toward said housing for discharging air from said discharge toward a target area, means supporting said housing for pivotal movement about said axis to vary the position of said discharge and means connecting the housing and a support structure to oscillate said housing and discharge about said axis for sequentially directing air flow toward a target area and toward an area spaced from the target area.

8. The blower as defined in claim 7 wherein said axis is generally horizontally disposed for movement of said discharge in a vertical plane.

9. The blower as defined in claim 7 wherein said means connecting the housing and a support structure includes an actuating rod having one end portion pivotally connected to said housing in spaced relation to said axis, the other end portion of said rod being connected to a power device for moving said rod in a manner to oscillate the housing about said axis.

10. The blower as defined in claim 9 wherein said power means includes a motor supported from said support structure, said motor including an output shaft having an eccentric thereon connected to said rod to move said rod to oscillate said housing.

11. The method of harvesting nuts and fruit or removing "mummys" from nut or fruit trees after harvesting consisting of the step of cyclically impinging an air blast onto the nuts or fruit or "mummys" for imparting cyclic movement to the tree limbs, nut or fruit or "mummys" for separation thereof from the tree, said step of impinging an air blast including the step of positioning a blower having a straight tangential air discharge in position to discharge an air blast onto the tree and oscillating the straight tangential air discharge to sweep the air discharge arcuately without altering the air flow path before the air leaves the straight tangential discharge to cyclically impinge an air blast onto the nuts or fruit or "mummys".

12. The method as defined in claim 11 together with the step of awaiting moist or wet atmospheric conditions before impinging an air blast onto the tree to enhance separation of "mummys" from the tree.

13. The method as defined in claim 11 together with the step of moving the blower along a row of trees to harvest nuts or fruit and remove "mummys" from a series of trees in the row.

14. A blower for dislodging nuts, fruit and "mummys" from a tree comprising a generally cylindrical housing having a substantially straight tangential air discharge and an axial air inlet, a driven rotatable vaned impeller mounted in said housing for discharging high velocity air from said air discharge, a support structure supporting said housing for oscillating movement about an axis to cyclically impinge high velocity air onto a tree canopy in a substantially straight flow path from said tangential discharge for dislodging nuts, fruit and "mummys" from the tree.

15. The blower as defined in claim 14 wherein said housing is supported for arcuate pivotal movement about the rotational axis of the impeller for discharging high velocity air in a substantially straight flow path toward a tree canopy without altering the direction of the flow path when the air is being discharged.

16. The blower as defined in claim 15 wherein power means interconnects the housing and support structure to oscillate said housing about the axis of the impeller for cyclically impinging high velocity air onto a tree canopy.

\* \* \* \* \*